| United States Patent [19] | [11] | 4,125,865 |
|---|---|---|
| Mohammadioun | [45] | Nov. 14, 1978 |

[54] RECORDING SYSTEM

[75] Inventor: Said Mohammadioun, Atlanta, Ga.

[73] Assignee: Lanier Business Products, Inc., Atlanta, Ga.

[21] Appl. No.: 756,386

[22] Filed: Jan. 3, 1977

[51] Int. Cl.² .......................... G11B 5/00; G11B 15/18
[52] U.S. Cl. ......................................... 360/32; 360/69
[58] Field of Search ................. 360/71, 69, 5, 52, 32; 179/100.1 VC

[56] References Cited

U.S. PATENT DOCUMENTS

| 3,132,213 | 5/1964 | Taylor et al. | 179/100.1 VC |
| 3,171,902 | 3/1965 | Jones et al. | 179/100.1 VC |
| 3,317,914 | 5/1967 | Liang | 360/52 |
| 3,838,445 | 9/1974 | Cupp et al. | 360/32 |
| 3,920,909 | 11/1975 | Furukawz | 179/100.1 VC |

Primary Examiner—Vincent P. Canney
Attorney, Agent, or Firm—Jones, Thomas & Askew

[57] ABSTRACT

A recording system including a recording apparatus, a time delay device wherein analog signals are converted into digital signals and wherein said digital signals are delayed for an interval of time to provide delayed digital signals which are recorded by said recording apparatus or which are converted into delayed analog signals that are then recorded by said recording apparatus, and means responsive to said analog signal or means responsive to said digital signal for causing the recording apparatus to be placed in a recording mode of operation prior to the end of said interval of time.

14 Claims, 8 Drawing Figures

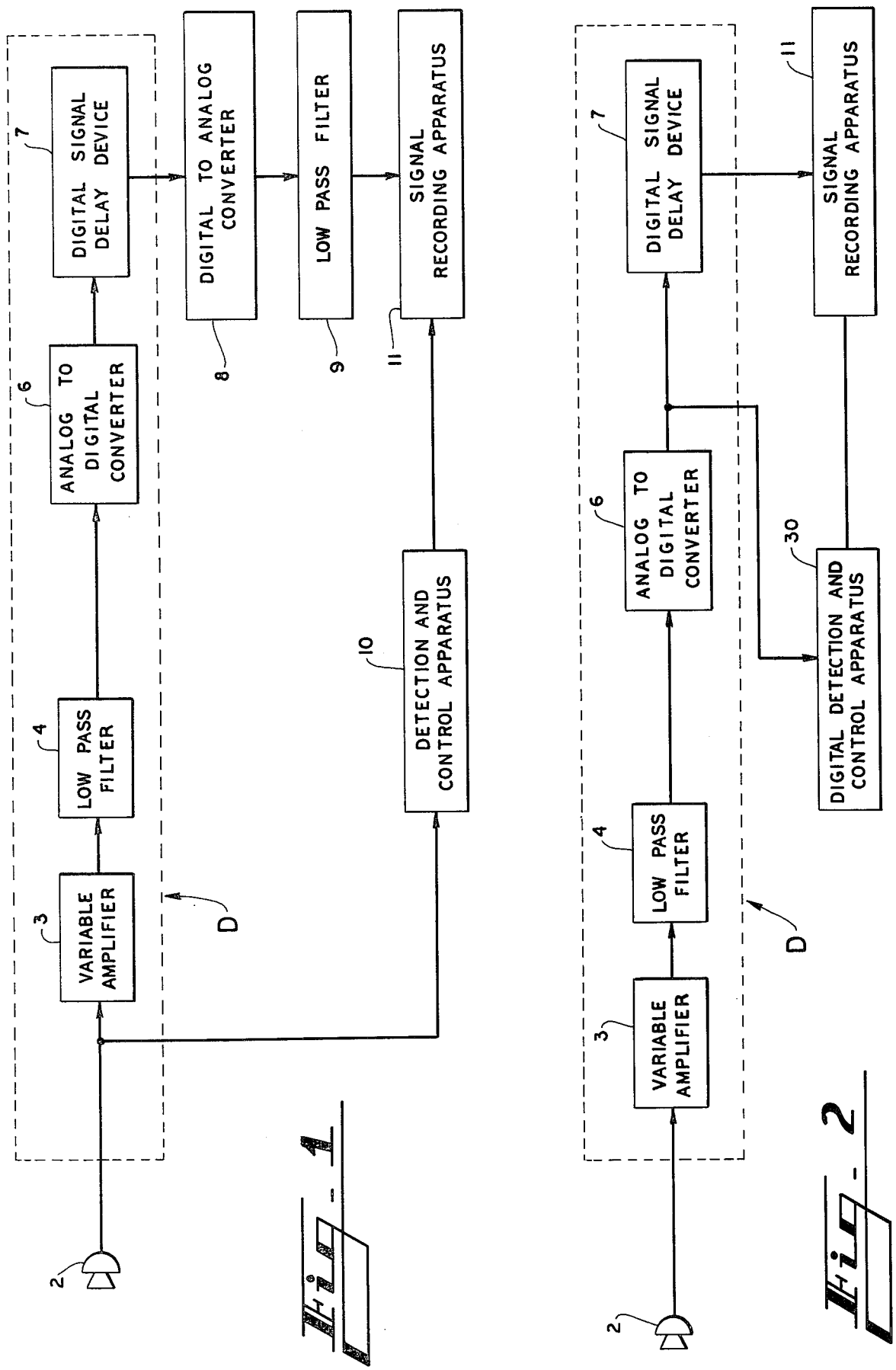

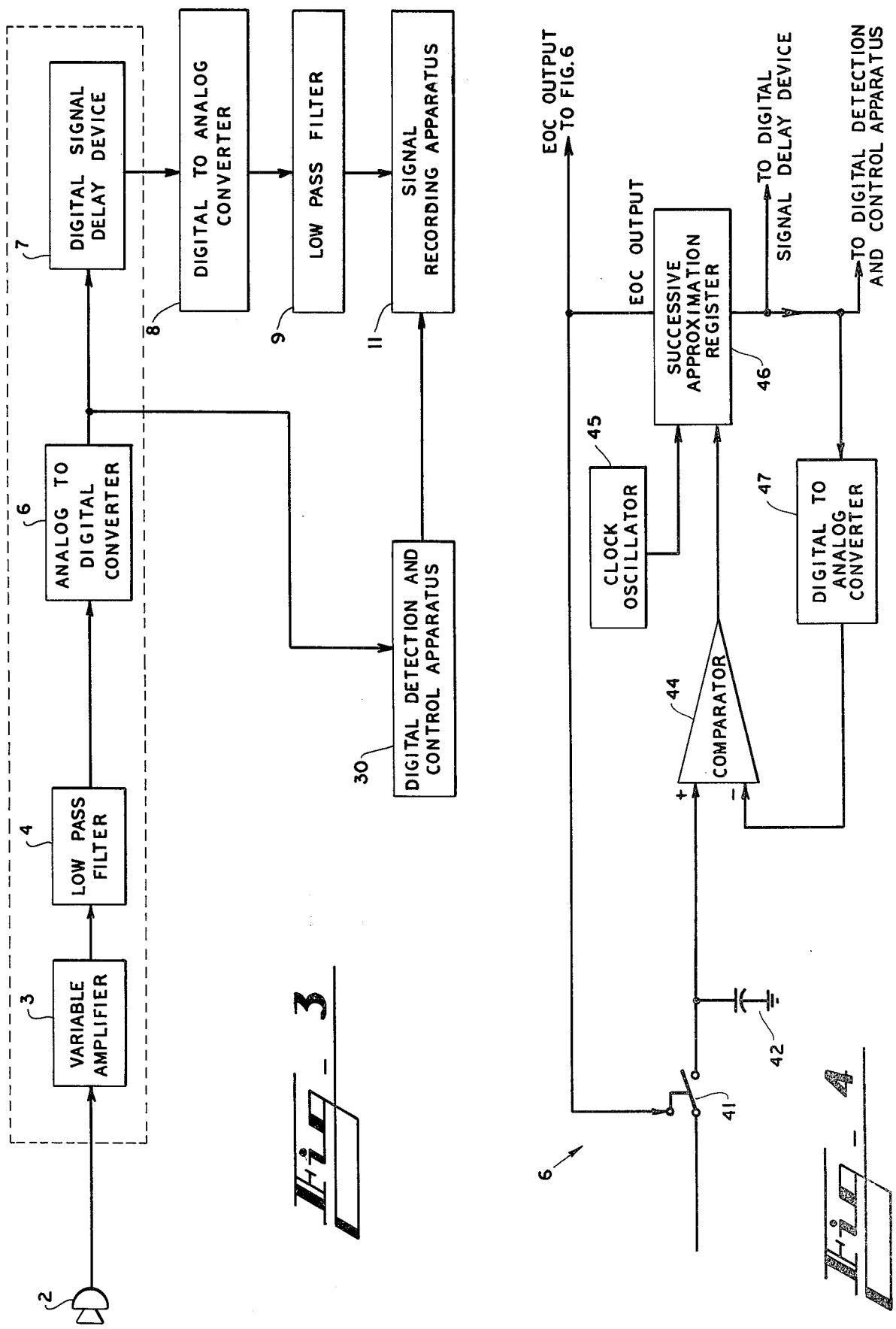

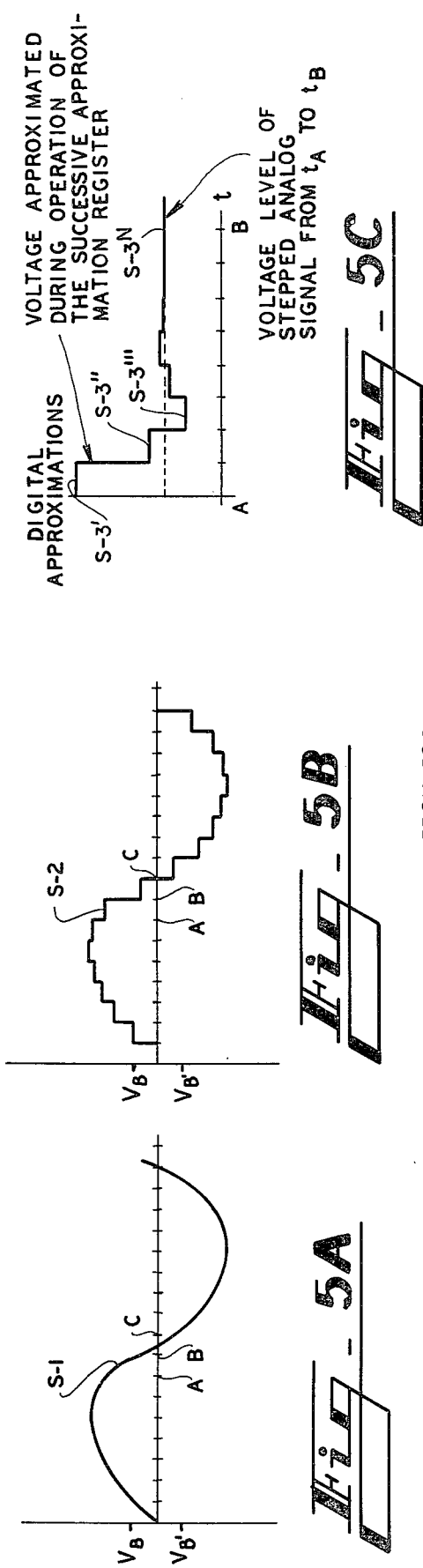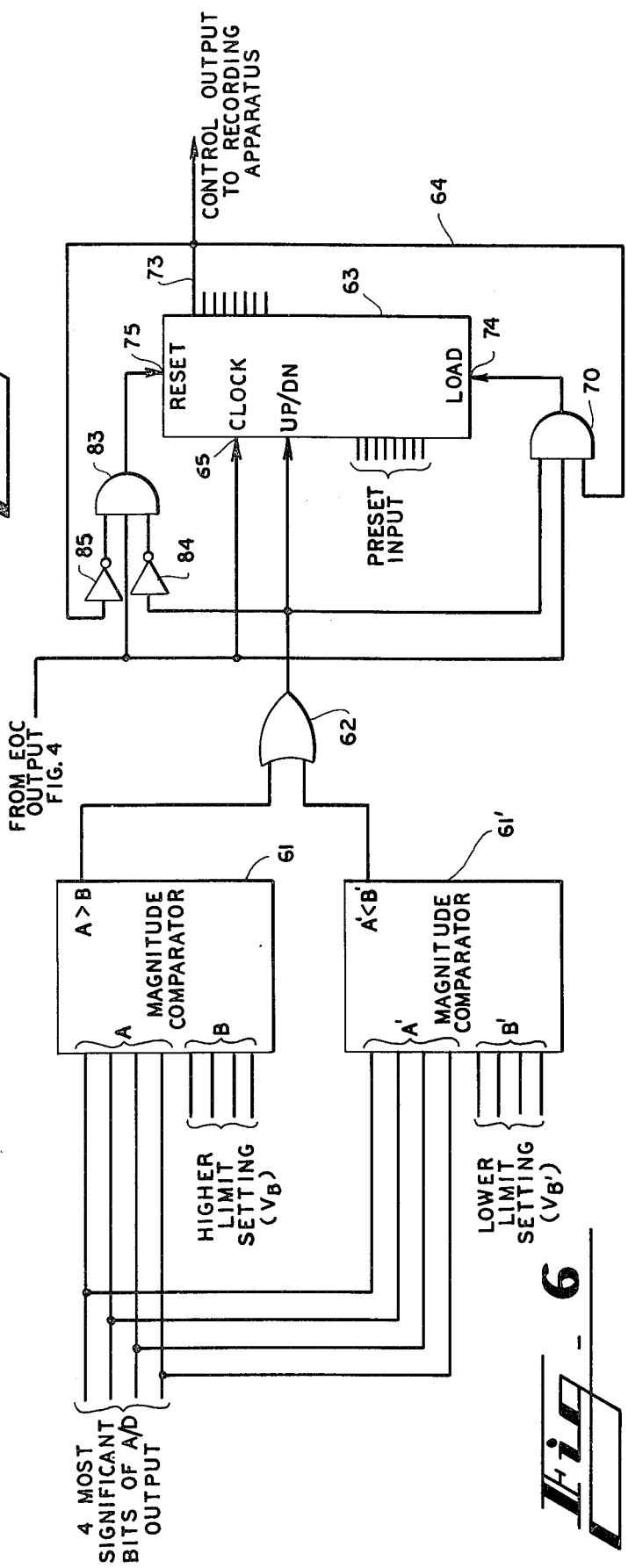

RECORDING SYSTEM

BACKGROUND OF THE INVENTION

This invention relates to recording systems and more particularly to a recording system for recording transduced electrical signals on a recording medium with a recording apparatus having a mode of operation responsive to the transduced electrical signals. Even more specifically, this invention is directed to systems for recording dictation. With respect to such a recording system, it is known in the art to use a detection and control apparatus for initiating and terminating the recording mode of operation of a recording apparatus in response to the presence or absence of sound generated electrical signals so that the recording apparatus is in the recording mode of operation only when there is dictation to be recorded.

The detection and control apparatus starts the recording mode of operation of the recording apparatus in response to sound generated electrical signals and terminates the recording mode of operation of the recording apparatus in response to the absence of sound generated electrical signals for a predetermined length of time. A detection and control apparatus is particularly useful in a recording system in which the source of the sound to be recorded is an individual who wishes to record dictation and who is remote from the recording apparatus with no means for controlling the recording mode of operation of the recording apparatus other than the sound of his voice and resulting sound generated electrical signals.

A difficulty which has been encountered in the use of a detection and control apparatus in a recording system is that the recording apparatus is not instantaneously placed in a recording mode of operation upon the initial detection of sound generated electrical signals by the detection and control apparatus. Therefore, the recording apparatus is not operating in the recording mode of operation when sound, such as the voice of a dictator, initially reaches the recording apparatus to be recorded as sound generated electrical signals. Thus, some of the sound, such as dictation, to be recorded is lost.

In order to solve this problem some prior art recording systems have used a supplementary recording device as a stage in the transmission of the sound generated electrical signals to the recording apparatus. This supplementary recording device records the initial sound and all subsequent sound as sound generated electrical signals and plays the sound generated signals back after a time delay to the recording apparatus for recording by the recording apparatus. The length of this time delay is determined by the length of time needed for the recording apparatus to be placed in the recording mode of operation by the detection and control apparatus after detection of the initial sound generated electrical signals by the detection and control apparatus. Once placed in the recording mode of operation by the detection and control apparatus, the recording apparatus receives and records the delayed initial sound generated electrical signals and all subsequent signals from the supplementary recording device until sound generated electrical signals have ceased for a predetermined length of time to cause the detection and control apparatus to terminate the recording mode of operation of the recording apparatus.

A recording system having a continuous loop recording device as a supplementary recording device is an example of a prior art recording system which uses a supplementary recording device. The continuous loop recording device has a recording head and a playback head positioned along a continuous loop of a recording medium, such as tape. The distance between the heads is such that the period of time required for the transit of the tape from the recording head to the playback head provides the time delay required for a detection and control apparatus to place the recording apparatus in the recording mode of operation.

The disadvantages of this and other prior art recording systems using supplementary recording devices are in the inherent risk of a mechanical failure or of tape breakage in the supplementary recording device. Moreover, the duplication of recording required the duplication of costly components in the supplementary recording device and in the recording apparatus and additional space to accommodate both the supplementary recording device and the recording apparatus. Furthermore, gradual degradation of the signal in the process of recording, playing back, and re-recording sound generated electrical signals introduces a substantial amount of distortion into the final desired recording of sound by a recording apparatus and thereby diminishes the quality of the recording.

In an effort to solve some of the problems encountered with prior art recording systems using supplementary recording devices, the prior art has also used an analog shift register in a recording system for delaying sound generated electrical signals in their transmission to a recording apparatus. While this recording system avoids some of the problems of cost and size encountered with prior art recording systems using supplementary recording devices, as well as the problems of tape breakage or mechanical failure, this prior art recording system still causes a gradual degradation of the sound generated electrical signals to be recorded by a recording apparatus and thereby diminishes the quality of the recording.

This diminution in the quality of the recording is unavoidable because the sound generated electrical signals are analog signals and because distortion of an analog signal usually occurs when an analog signal is amplified and processed through an analog shift register to provide a time delay. Moreover, the infinite variety of distinct analog wave forms in an analog signal generated by sound such as human speech precludes any reconstruction of the analog signal after it has been passed through the shift register.

Therefore, the quality of the recording is irretrievably lost after distortion in an analog shift register. The invention disclosed herein solves this problem of distortion by gradual signal degradation and other problems encountered in prior art recording systems having a detection and control apparatus to control the recording mode of operation of a recording apparatus so that the recording apparatus is in the recording mode of operation when there is sound to be recorded.

SUMMARY OF THE INVENTION

The invention disclosed herein is a recording system which has a time delay device that delays the transmission of sound to be recorded by a recording apparatus until the recording apparatus has been placed in a recording mode of operation by a detection and control apparatus in response to the presence of sound to be recorded. However, it has neither the inherent disadvantages of recording systems which use supplementary recording devices nor the distortion caused by gradual signal degradation as in prior art recording systems in which the sound generated signal is recorded, played back, and re-recorded or amplified and processed through an analog shift register to obtain a time delay.

This improvement in recording systems is provided by a recording system having a time delay device which converts sound generated electrical signals from analog signals into digital signals for processing through a digital signal delay device to a recording apparatus that has been placed in a recording mode of operation by a detection and control apparatus prior to the end of the time delay provided by the time delay device. Depending upon the embodiment of the invention, the detection and control apparatus is responsive to the presence or absence of sound generated electrical signals as in prior art recording systems or is responsive to the presence or absence of digital signals generated in the present system. The latter improvement provides a more reliable detector of human speech and control of the recording mode of operation of the recording apparatus than has been achieved in prior art recording devices.

Moreover, depending upon the embodiment of the invention, the invention provides for the recording by a recording apparatus of the transduced electrical signals on a recording medium either as analog signals which are substantially identical to the sound generated electrical signals or as digital signals that can be subsequently converted into analog signals which are substantially identical to the sound generated electrical signals. However, regardless of the embodiment of the invention, the invention provides a recording system in which there is substantially less distortion of sound generated electrical signals to be recorded by a recording apparatus than in prior art recording systems. This is because digital signals are easily restored and reconstructed since each bit of digital information possesses either one of two values. Thus, circuit elements in the time delay device are able to accurately amplify or reproduce the digital signals and to accurately reconvert them into the analog signals which the digital signals had accurately approximated for recording by the recording apparatus.

DESCRIPTION OF THE DRAWINGS

These and other features and advantages of the present invention will be more clearly understood upon consideration of the following specification and accompanying drawings in which:

FIG. 1 is a block diagram of an embodiment of the invention in which the recording apparatus records transduced analog electrical signals on a recording medium and in which the detection and control apparatus is responsive to the sound generated electrical signals prior to such signals entering the time delay device;

FIG. 2 is a block diagram of an embodiment of the invention in which the recording apparatus records transduced digital electrical signals on a recording medium and in which the detection and control apparatus is responsive to digital signals from the time delay device;

FIG. 3 is a block diagram of an embodiment of the invention in which the recording apparatus records transduced analog electrical signals on a recording medium and in which the detection and control apparatus is responsive to digital signals from the time delay device;

FIG. 4 is a schematic diagram of the analog to digital converter in those embodiments of the invention shown in FIGS. 1, 2, and 3;

FIG. 5A is a graphic representation of the sound generated electrical signals as they enter the analog to digital converter of FIG. 4;

FIG. 5B is a graphic representation of the stepped analog signal provided within the analog to digital converter of FIG. 4 in response to the sound generated electrical signal of FIG. 5A;

FIG. 5C is a graphic representation of the operation of the successive approximation register in the analog to digital converter of FIG. 4 and shows the digital approximation of a voltage level corresponding to the stepped analog signal that is shown between the points A and B on the time axis of FIG. 5B and that corresponds to the sound generated electrical signal shown between points A and B on the time axis of FIG. 5A; and FIG. 6 is a block diagram of the digital detection and control apparatus in that embodiment of the invention shown in FIG. 2 and 3.

DETAILED DESCRIPTION OF THE EMBODIMENTS

In the following description of several embodiments of the invention, the invention is embodied in a recording system for recording sound such as the dictation of a dictator including a recording apparatus 11 which is placed and maintained in a recording mode of operation by a detection and control apparatus while there is sound to be recorded. However, it will be understood that the invention may be embodied in other forms and in particular, it will be understood that the invention is not limited only to those recording systems described herein.

Rather, the invention may be embodied in recording systems which record any form of electrical signal whether initially generated by a sound or not. Moreover, it may be embodied in a recording system which does not include a detection and control apparatus and in which the time delay device disclosed herein serves only to improve the quality of the sound to be recorded by a recording apparatus 11.

This will be better understood from a consideration of FIG. 1 which is a block diagram of a recording system that embodies the invention disclosed herein. The recording system includes a recording apparatus 11 which may be any conventional recording apparatus for recording sound as transduced sound generated analog or digital electrical signals on a recording medium such as a tape or disc, an audio converter 2 which may be any conventional transducer such as a microphone for converting the sound into sound generated electrical signals which are analog signals, a variable amplifier 3, a low pass filter 4, an analog to digital converter 6 for converting analog signals to digital signals, a digital signal delay device 7, a digital to analog converter 8 for converting digital signals to analog signals, a low pass filter 9, and a detection and control apparatus 10.

As will be set forth more fully below, the purpose of the digital signal delay device 7 is to provide a means for delaying or storing a digital signal for a desired period of time after it has been generated by the analog to digital converter 6 and before transmitting it to the recording apparatus 11. Thus, any digital hardware device or programmed digital device which will perform this function by delaying or storing the digital signal for a desired period of time is a digital signal delay means within the definition of the present invention. While the digital signal delay device 7 described in the present embodiment of the invention is a shift register, it is further disclosed that an alternative embodiment of this invention may include a random access memory. In that embodiment, the random access memory receives the successive digital signals from the analog to digital converter 6 and stores the digital signals for a desired period of time after which the digital signals are successively retrieved from the random access memory in the sequence stored and transmitted to the recording apparatus 11.

It will also be understood that the recording apparatus 11 may be any conventional recording apparatus for recording transduced analog or digital electrical signals on a recording medium such as a tape or disc. Inasmuch as the present invention provides for converting sound generated analog electrical signals into digital signal approximations of the sound generated analog electrical signals, the signals are placed in condition for recording by a recorder adapted for recording sound on a recording medium as transduced digital electrical signals. The present invention also provides for reconverting the digital signal approximations of the sound generated analog electrical signals into analog electrical signals after said digital signals have been delayed by the digital signal delay device 7. The reconverted analog electrical signals are then in condition for recording by a recorder adapted for recording sound on a recording medium as transduced analog electrical signals. The recording apparatus adapted for recording sound on a recording medium as transduced digital electrical signals may be distinct from a recording apparatus adapted for recording sound on a recording medium as transduced analog electrical signals; however, the recording apparatus may also be adapted for recording sound on a recording medium both as transduced analog or electrical digital signals. Therefore, in the recording system of the present invention, the recording apparatus 11 is not limited only to recording apparatus adapted solely for recording sound on a recording medium as either transduced digital electrical signals or as transduced analog electrical signals, but is referred to as the recording apparatus 11 without further limitation.

In the embodiment of the invention shown in FIG. 1, the sound to be recorded is the voice of a person who wishes to record dictation and it will be understood that the sound generated electrical signals from the audio converter 2 are in the audio frequency range. In the embodiment of the invention shown in FIG. 1, as well as in the embodiments of the invention shown in FIGS. 2 and 3, the variable amplifier 3, the low pass filter 4, the analog to digital converter 6, and the digital delay device 7 provide a time delay device D for causing the sound generated electrical signals from the audio converter 2 to reach the recording apparatus 11 a predetermined length of time after the detection and control apparatus 10 or 30 has placed the recording apparatus 11 in a recording mode of operation. In the particular embodiment of the invention shown in FIG. 1, the detection and control apparatus 10 is responsive to the sound generated electrical signals from audio converter 2, and as a result, the detection and control apparatus 10 may be a conventional voice operated relay which operates the recording apparatus in conventional manner to cause the recording apparatus 11 to be placed in a recording mode of operation in response to the initial sound generated electrical signals from the audio converter 2 and to continue in a recording mode of operation until there have been no sound generated electrical signals from the audio converter 2 for a predetermined length of time.

However, it will be understood that in all of the embodiments of the invention shown in FIGS. 1, 2 and 3, the sound generated electrical signals are transmitted to the variable amplifier 3 of the time delay device D which is selectively varied in conventional manner to adjust the amplitude of the sound generated electrical signals from the audio converter 2 to compensate for any loss of amplitude because of the length of the line 1 between the audio converter 2 and the time delay device.

Those skilled in the art will understand that the time delay device D need not include the variable amplifier 3 if the line 1 is relatively short so that line loss is minimal or if the sound generated electrical signals would otherwise be of sufficient amplitude for processing through the time delay device D as described herein when they reach the low pass filter 4.

Whether the time delay device D includes a variable amplifier or not, the low pass filter 4 operates in conventional manner to pass only those frequencies of the sound generated electrical signals which can be accommodated by the subsequent analog to digital converter 6 without distortion from undersampling. Moreover, in recording systems such as those in FIGS. 1, 2 and 3 in which the sound to be recorded is the voice of a dictator the low pass filter 4 can be selected not to pass frequencies over 3khz so as to eliminate background noise.

From FIG. 4, it will be seen that the analog to digital converter 6 includes a switching means 41, such as a complementary metal oxide semiconductor analog switch, for selectively passing electrical currents, which when momentarily operated will cause the capacitance 42 to charge to a voltage corresponding to the amplitude of the sound generated electrical signals from the low pass filter 4 at the time that the switching means 41 is momentarily operated. During the periodic intervals of time in which the switching means 41 is not operating to introduce the sound generated electrical signals from the low pass filter 4, the charge of the capacitance 42 is maintained at a constant level of voltage.

Thus, it will be understood the switching means 41 and the capacitance 42 serve as a sampling means for providing successive samples of the sound generated electrical signals such as the sample S-1 represented between points A and B in FIG. 5A. It will also be understood that the operation of the switching means 41 is regulated in conventional manner by the successive approximation register 46 which causes the switching means 41 to charge the capacitance 42 with a new sample of the sound generated electrical signals each time the successive approximation register 46 ends an approximation cycle as described below.

It will be understood that when the capacitance 42 is successively charged to voltages corresponding to successive amplitudes of the sound electrical signals, the sound generated electrical signals are changed from continuous wave analog signals as shown in FIG. 5A to stepped analog signals as shown in FIG. 5B. For example, the continuous wave analog signal of the sample S-1 between points A and B in FIG. 5A becomes in the capacitance 42 the stepped analog signal S-2 between points A and B in FIG. 5B.

The stepped analog representation shown in FIG. 5B is then converted into a series of digital signals in which each digital signal represents a binary number approximating the voltage of a corresponding step in the stepped analog representation of the sound generated electrical signal. A successive approximation register 46 performs this function. The binary approximation is achieved by serially comparing each of the stepped analog voltages, such as the signal S-2 at the capacitance 42, with successive analog conversions of digital signals generated by the successive approximation register 46 as successive binary approximations of the analog voltage. The conversion of each of these digital signals into analog voltages is accomplished by using a digital to analog converter 47 to convert the digital signals, each of which represents a binary approximation of the stepped analog voltage, to their corresponding analog voltages, such as the voltage S-3′ in FIG. 5C. The analog conversion of a binary approximation is then introduced into the comparator 44 and compared with the stepped analog signal to be approximated.

It will be understood that, depending upon the output from the comparator 44 after the comparison of the stepped analog signal S-2 and the analog voltage S-3′ corresponding to the first binary approximation of the analog voltage S-2, the successive approximation register 46 will make another digital approximation which is converted to its corresponding analog voltage S-3″ by the digital to analog converter 47 and then similarly compared with the stepped analog signal S-2. This process is continued for a predetermined number of approximations N until the stepped analog signal S-2 at the capacitance 42 has been accurately approximated as by the analog voltage S-3N in FIG. 5C.

Those skilled in the art will understand that upon completion of the successive approximations necessary to accurately approximate the stepped analog voltage S-2, the successive approximation register 46 will have generated a digital signal, consisting of a sequence of electrical bits, electrically representing a binary number. Moreover, they will also understand that the digital signal corresponding to the analog voltage S-3N in FIG. 5C represents a binary number which accurately corresponds to the stepped analog voltage S-2 of FIG. 5B which in turn corresponds to the sound generated electrical signal S-1 of FIG. 5A.

It will also be understood that upon completion of the predetermined number of approximations by the successive approximation register 46, the successive approximation register 47 provides an end of cycle (EOC) output. The EOC output causes the sequence of electrical bits representing the binary number S-3N to be transferred from the successive approximation register 47 into the digital signal delay device 7. It also causes the switch 41 to close and charge the capacitor 42 to another stepped analog voltage such as that between points B and C in FIG. 5B.

Thus, the successive operation of analog to digital converter 6 as described above results in the sound generated electrical signals from the low pass filter 4 being changed from continuous wave analog signals as shown in FIG. 5A to a series of digital signals, each consisting of of a sequence of electrical bits representing a binary number. Those skilled in the art will understand that the accuracy with which these digital signals represent the sound generated electrical signals from the low pass filter 4 depends upon the rate at which the sound generated electrical signals are sampled by the sampling means provided by the switching means 41 and the capacitance 42. In the presently described embodiment, this sampling rate is in turn determined by the rate at which the successive approximation register 46 completes its predetermined number of approximations and provides an EOC output to the switching means 41. This rate of approximation completion is controlled by the frequency of a clock oscillator 45 and by the predetermined number of approximations N made by the successive approximation register 46.

Thus, in the analog to digital converter 6 as shown in FIG. 4, the clock oscillator 45 has a 100 khz frequency and the predetermined number of approximations N made by the successive approximation register 46 in response to the clock oscillator is nine followed by an EOC output to the switching means 41 and the simultaneous transfer to the shift register 7 of the digital signal corresponding to the ninth approximation. As a result, the sampling rate at which the switching means 41 is operated to sample the sound generated electrical signals from the low pass filter 4 is 10 khz. The sampling rate must be chosen to be at least twice as great as the highest frequency analog electrical signal to be approximated.

From this sampling rate, it will be readily understood by those skilled in the art that FIGS. 5A, 5B and 5C are merely illustrative since this rate causes the time between the points A and B on the time lines in these figures to be only 1/10000th of a second and the frequencies of sound generated electrical signals admitted through the low pass filter 4 is 3Khz or less. The period of the signals is therefore at least three times the period of each sample. FIG. 5A is merely illustrative of the technique and the sampling rate is exaggerated. Moreover, it will be readily understood that at this rate and at other rates which will be apparent to those skilled in the art, the digital signals from the successive approximation register 46 will accurately represent the sound generated electrical signals from the low pass filter 4.

In those embodiments of the invention disclosed herein, the digital signals received from the analog to digital converter 6 by the digital delay device 7 must be retained within the digital delay device 7 for a sufficient period of time to allow a detection and control apparatus 10 or 30 to cause the recording apparatus 11 to be placed in the recording mode of operation. Accordingly, if the digital delay device 7 includes a plurality of digital shift registers, the number of digital shift registers must be sufficient to simultaneously transmit the complete sequence of electrical bits needed to electrically represent each binary number as each new digital signal is received from the analog to digital converter 6. Moreover, since the digital delay device 7, in this case a plurality of digital shift registers, operates in response to the EOC output from the analog converter 6, each digital shift register must be of sufficient capacity so that, in spite of its successive operation in response to the EOC to keep up with the analog to digital converter 6, the digital delay device 7 will retain the initial digital signal for a sufficient period of time to allow a detection and control apparatus 10 or 30 to cause the signal recording apparatus 11 to be placed in a recording mode of operation before the initial digital signal passes from the time delay device D.

For example, with further reference to the alternative embodiment in which the digital delay device 7 is a shift register and in which each digital signal from the analog to digital converter 6 at the end of each approximation cycle is a digital signal consisting of a sequence of eight bits which represents a binary number, the number of digital shift registers must be suffient to receive simultaneously all eight bits from the analog to digital converter 6. Moreover, if each of these eight bits is transmitted at the rate of 10 khz described above, through a shift register which is sufficiently long to contain 1024 distinct digital signals, the plurality of shift registers will serve as a digital signal delay device and provide a time delay of 102.4 milliseconds. Those skilled in the art will understand that this time delay and other time delays which can be readily obtained by varying the rate of shift and the length of the shift register are adequate periods in which to place a recording apparatus 11 in its recording mode of operation.

Similarly, in those alternative embodiments in which the digital signal delay device 7 includes a plurality of random access memories, the number and capacity of the random access memories must be sufficient to simultaneously store the desired number of digital signals, each consisting, for example, of eight bits, for the desired period of time. Since the input and output of the random access memories are similarly controlled by the EOC output of the successive approximation register 46, the collective storage capacity of the random access memories must be large enough that a digital signal made up of eight bits which has been stored in the random access memories may continue to be stored within the random access memories for the desired period of time delay without having to be removed in the sequence in which it was stored in order to make room for later arriving digital signals which are being introduced into the random access memory at the rate dictated by this frequency of approximation of the successive approximation register 46. For example, if the successive approximation register 46 approximates the analog signals at a rate of 10 khz and each digital approximation consists of eight bits, the collective storage capacity of the random access memories needed in order to provide a delay of 102.4 milliseconds will be 8192 bits. This collective storage capacity may, for example, be provided by eight random access memories each having a storage capacity of 1024 bits or by four random access memories each having a storage capacity of 2048 bits. In the case where at least two bits of the same digital signal are to be stored in the same random access memory, the bits of input must be multiplexed for simultaneous input and output.

In that embodiment of the invention shown in FIG. 1, digital signals from the time delay device D are transmitted into a digital to analog converter 8 for converting the digital signals from the time delay device D into analog signals corresponding to the analog signals originally approximated by the anolog to digital converter 6. The digital to analog converter 8 may be any one of a number of well known and commercially available digital to analog converters. However, a digital to analog converter 8 which is well adapted to the embodiment of the invention shown in FIG. 1 is a digital to analog converter that generates a stepped signal based upon the successive binary numbers it receives as digital signals from the time delay device D.

These stepped electrical signals are transmitted through a low pass filter 9 which filters the higher harmonics in the stepped analog signals for accurately approximating the sound generated electrical signals, such as that of FIG. 5A, that were initially introduced into the time delay device D. These analog signals may then be transmitted from the low pass filter 9 to the recording apparatus 11 and recorded.

The embodiment of the invention shown in FIG. 2 includes the audio converter 2, a recording apparatus 11, and the time delay device D. However, it differs from the embodiment of the invention shown in FIG. 1 in that it does not include the digital to analog converter 8 and the low pass filter 9. Thus, in the embodiment of the invention shown in FIG. 2, the sound generated electrical signals from the audio converter 2 are recorded by the recording apparatus 11 as digital signals.

The embodiment of FIG. 2 also differs from the embodiment of FIG. 1 in that the detection and control apparatus 30 for causing the recording apparatus 11 to be placed in a recording mode of operation is responsive to the digital signal from the analog to digital converter 6 rather than to the sound generated signals from the audio converter 2. In this respect the embodiment of the invention shown in FIG. 2 is similar to the embodiment shown in FIG. 3 which is identical to the embodiment shown in FIG. 1 and described above except that it also includes a detection and control apparatus 30 for placing the recording apparatus 11 in a recording mode of operation in response to the digital signal from the analog to digital converter 7.

From FIG. 6, it will be seen that the digital detection and control apparatus 30 includes at least two digital magnitude comparators 61 and 61' for detecting the presence of digital signals above and below a preselected digital value. The digital magnitude comparators 61 and 61' are connected by an "or" gate 62 which will provide an "up" to an up-down counter 63 output signal in response to a signal to a signal from either digital magnitude comparator 61 or 61'. The arrangement of the comparators 61 and 61' in the embodiment illustrated in FIG. 6 makes the digital detection and control apparatus 30 responsive to digital signals which have values greater or less than a range of digital values between an upper limit VB set into the digital magnitude comparator 61 and a lower limit VB' set into the digital magnitude comparator 61'. This will be more clearly understood from a consideration of FIG. 5A in which the voltage S1 is the D.C. amplitude of the sound generated electrical signals shown in FIG. 5A and in which the voltages VB and VB' are voltages which have been arbitrarily selected as voltages which will generally be exceeded by the amplitude of sound generated electrical signals caused by human speech desired to be recorded, but not by the amplitude of sound generated electrical signals caused by background noise. It should be further understood at this point that the analog to digital converter 6 will provide digital signals corresponding to all analog signals converted by the audio converter 2 and passed through the low pass filter 4 regardless of amplitude, even if between B2 and B3' or greater than B2 or less than B3'.

It will be understood by those skilled in the art that digital magnitude comparators are digital logic devices which provide a particular output depending upon the result of the comparison of a preselected digital value selected for comparison with a separate digital input with that separate digital input. The digital input provided for comparison is the digital output from the analog to digital converter 6 as set forth above. In the embodiment of the analog to digital converter 6 which has been described, the digital signal output from the analog to digital converter 6 consists of a sequence of eight bits. However, the comparison voltages VB and VB' may be determined by reference to the four most significant bits of the binary numbers representing VB and VB'. For example, the digital value of the threshold voltage of sound to be recorded might be determined to be 00111011. Any digital signal above 00110000 might be sufficiently near this threshold voltage that the detection and control apparatus could be responsive to all such signals without sacrificing any operational advantages. Therefore, the digital magnitude comparator 61 may be set to compare only the four most significant bits of each digital signal from the analog to digital converter 6 with the binary sequence 00110000. This preselected binary sequence is set into the digital magnitude comparator 61 in the conventional manner to function as the higher limit setting VB. Similarly, another binary sequence is set into the digital magnitude comparator 61' in the conventional manner to function as the lower limit setting VB'.

Since, as indicated above, the digital magnitude comparator 61 provides a discrete "up" signal to the up-down counter 63 through the "or" gate 62 indicating when the digital signal from the analog to digital converter 6 is greater than the upper limit setting and the digital magnitude comparator 61' provides an "up" signal to the up/down counter 63 through the "or" gate 62 indicating when the digital signal from the analog to digital converter 6 is less than the lower limit setting, it will be understood that the digital magnitude comparators 61 and 61' serve to provide "up" signals to the up-down counter 63 only when the digital signal output from the analog to digital converter 6 indicates the presence of sound generated electrical signals from the audio converter 2 as defined by amplitudes above VB and below VB' in FIG. 5A.

It is by only permitting "up" signals to be provided to the up-down counter 63 in response to electrical signals having a magnitude above VB or below VB' that the comparators 61 and 61' detect the presence of sound generated electrical signals provided by human speech or dictation desired to be recorded. Further, it will be understood that the comparators 61 and 61' will not provide "up" signals to the up-down counter 63 in response to noise from the audio converter 2 and the low pass filter 4 as defined by signals having amplitudes between VB and VB' in FIG. 5A. In addition, it will be understood that the sensitivity of the detection and control apparatus 30 in terms of its ability to respond to sound generated electrical signals which are to be recorded, while not responding to noise, may be selectively adjusted by simply changing the higher limit setting, the lower limit setting, or both settings.

As shown in FIG. 6, the up-down counter 63 which receives "up" signals from the magnitude comparators 61 and 61' also has an input 65 from the EOC output of the successive approximation register 46 in the analog to digital converter 6. The EOC output of the successive approximation register 46 provides a clock input 65 to the up-down counter 63 and controls the up-down counter 63 to cause it to operate only at the end of each approximation cycle of the analog to digital converter 6. Thus, the up-down counter 63 only operates in response to those "up" signals from the comparators 61 and 61' which are caused by the digital signals from the analog to digital converter 6 which represent the final approximation of the sound generated electrical signals. It will be further understood that the up-down counter 63 will not be responsive to digital signals of large magnitude which may be generated by the successive approximation register 46 during the process of digitally approximating the sound generated electrical signals.

It will be understood by those skilled in the art that an up/down counter may count in a binary system and that the binary number indicated by the up/down counter is changed in response to the presence or absence of "up" signals at the input to the counter. It will be further understood that the up/down counter may have separate load and reset inputs which cause the up/down counter to indicate a preselected number or zero, respectively, in response to an input at load or reset. It will also be understood that an up/down counter which counts in a binary system has separate outputs provided by the presence of a "one" at particular places in the sequence of bits which makes up the binary number. For example, an output may be provided by the presence of a "one" at the seventh place in the binary number 01000000 which corresponds to the number 64 in a decimal number system.

Referring now to the embodiment of the detection and control apparatus 30 shown in FIG. 6, the up/down counter 63 is a binary up/down counter which is responsive to the output of the "or" gate 62 each time the EOC input causes the up/down counter 63 to count. The presence of an "up" signal from the "or" gate 62 at the input of the up/down counter 63 causes the up/down counter 63 to count up thereby causing the number indicated to increase by one The absence of an "up" signal from the "or" gate 62 at the input of the up/down counter 63 causes the up/down counter 63 to count down thereby causing the number indicated to decrease by one.

The control output 73 is selected from among the different outputs of the up/down counter 63 to cause output only after there have been continuous input signals for a desired period of time to assure that the "up" is caused by continuous dictation. Thus, in the embodiment of the detection and control apparatus 30 shown in FIG. 6, the output is chosen to correspond to the eighth place in the binary counter so that a control output will be caused by the presence of a "one" in the eighth place of the counter indicating that it has counted to binary 10000000 (or 128 in the decimal system), the control output initiation number. As set forth above, the frequency of the clock oscillator 45 provides an EOC output from the successive approximation register 46 at a frequency of 10khz. Therefore, continuous signals will be required for a period of 12.8 milliseconds in order for the up/down counter to cause a control output 73. Moreover, such a control output 73 will continue as long as a "one" remains at the eighth binary position of the up/down counter 63.

The embodiment of the detection and control apparatus 30 shown in FIG. 6 also includes a feedback circuit 64 from a preselected output of the up/down counter 63 to an "and" gate 70. For reasons that will become apparent, the output of the up/down counter 63 which will be chosen for the feedback circuit is the output that is provided by the presence of a "one" at the eighth binary position of the up/down counter 63. However, it will be understood that an output of the up/down counter 63 other than that caused by the presence of a "one" at the eighth binary position could have been chosen.

In addition to the input from the feedback circuit 64, the "and" gate 70 also has inputs from the EOC output of the successive approximation register 46 and from the "or" gate 62. Thus, the simultaneous presence of a "one" at the eighth binary position of the up/down counter 63 (also causing a control output 73), an EOC signal, and an output from the "or" gate 62, indicating the continuation of dictation, causes an output to be provided from the "and" gate 70 to the load input 74 of the up/down counter 63. Conversely, the absence of dictation reflected by the absence of an output from the "or" gate 62 precludes a load output from the "and" gate 70. This permits the up/down counter 63 to count down by preventing the up/down counter 63 from loading the preselected member.

As described above, the effect of a load input 74 at the up/down counter 63 is to cause the up/down counter 63 to advance to a preselected number. The selection of this number can be made in such a manner as to cause the up/down counter 63 to be advanced a sufficient number of binary numbers so that, despite the continued absence of signals from the "or" gate 62 and the concurrent counting down of the up/down counter, a "one" will remain at the output of the up/down counter 63 chosen as the control output 73, in the case of the present embodiment the eighth binary position, for a predetermined period of time. In the case of the present embodiment, the preselected binary number chosen to be loaded is 11111111 (the equivalent of decimal 255). Since a "one" is present in this preselected number at the binary position chosen as the control output 73, the control output 73 will continue until there is no longer a "one" in the eighth binary position, even though the absence of dictation signals has caused the up/down counter 63 to count down below 11111111. Thus, the person dictating may pause for a period of time, established by the number of cycles by which the preselected number (255) exceeds the lowest number at which a control output 73 is provided (128) and the period of time between each EOC signal (0.1 milliseconds), without causing the recording apparatus 11 to be taken out of the recording mode of operation. This period of time permitted for a pause will be 12.8 milliseconds in the present embodiment. It will be further understood by those skilled in the art that since the load input 74 responsive to continued dictation signals from the "or" gate 62 does not permit the up/down counter 63 to count above the preselected number, the period of time permitted for a pause will be constant regardless of the length of time for which the speaker has been dictating continuously prior to the pause.

As set forth above, the up/down counter 63 also has a reset input 75 which will cause the up/down counter 63 to indicate zero or 00000000 in a binary number system whenever an input signal is received at the reset input. In the embodiment of the detection and control apparatus 30 shown in FIG. 6, the reset input 75 is electrically connected to an "and" gate 83. Thus, the up/down counter 63 will be reset to zero whenever an output from the "and" gate 83 is provided.

The inputs to the "and" gate 83 are provided by: the EOC output from the successive approximation register 46; the output of a first inverter 84 responsive to the absence of dictation signals from the "or" gate 62; and the output of a second inverter 85 responsive to the absence of a signal from a preselected output of the up/down counter 63. In the presently disclosed embodiment, the output of the up/down counter 63 chosen to provide an input to the second inverter 85 is the output corresponding to the eighth binary position of the counter, the control output termination number. However, it will be understood that the preselected output may have been chosen from another output of the up/down counter 63.

The "and" gate 83 will, therefore, only reset the up/down counter 63 to zero at the end of an approximation cycle (EOC), when the absence of an output signal from the "or" gate 62 indicates the absence of dictation and when there is also no control output 73 from the up/down counter 63. Thus, in the present embodiment, the up/down counter 63 will reset to zero once the up/down counter 63 counts down from the second preselected load number (255) to below the first preselected number (128), which is therefore both the control output initiation and termination number, without a resumption of dictation. It will be further understood that once the up/down counter 63 has counted below the preselected control output termination number (128) and has been reset to zero, the zero will be maintained in the up/down counter 63 until the output from the "or" gate 62 indicates the resumption of dictation and the up/down counter 63 begins to count up. Thus, the continued absence of dictation will not cause the up/down counter to "count" down below zero and "roll-over" to produce a control output 73, but the up/down counter 63 will retain the zero until actual dictation as indicated by the output at the "or" gate 62 resumes.

It will now be understood by those skilled in the art that the digital detection and control apparatus 30 shown in FIG. 6 will provide a control output 73 to the recording apparatus 11 to place the recording apparatus 11 in the recording mode of operation upon the detection of dictation. It will be further understood that the absence of a control output 73 caused by the absence of dictation for a predetermined period of time will cause the recording apparatus 11 to be taken out of the recording mode of operation. In addition, it will be understood that the digital detection and control apparatus 30 is selectively adjustable so as to provide a control output only upon the detection of desired sound signals of desired magnitude such as speech or dictation and not background noise. The digital detection and control apparatus 30 is also selectively adjustable so as to provide a control output only in the presence of continuous sound generated signals of selected duration thereby eliminating a control output in response to short loud noises which are not dictation. It will also be understood that the digital detection and control apparatus 30 is selectively adjustable so that pauses or breaks in dictation of a selected short period will not cause the recording apparatus 11 to be taken out of the recording mode of operation.

The foregoing description sets forth illustrative embodiments of the invention in a signal recording system comprising a signal recording apparatus and a signal time delay system. It is to be understood that the signal time delay system may be used in any signal recording system, regardless of whether the signal is generated by an audio signal or not. It is further understood that the foregoing embodiments are merely illustrative embodiments of the invention and that the scope of the invention is limited solely by the appended claims.

What is claimed is:

1. A recording system having a recording means for recording analog electrical signals on a recording medium when said recording means is in a recording mode of operation, and a means for introducing input electrical signals into said system and for processing said input electrical signals to provide said analog electrical signals for recording on said recording medium by said recording means, wherein the improvement comprises:
- a first means responsive to said input electrical signals for providing delayed digital signals, said first means comprising
  - an analog to digital conversion means for converting said input electrical signals to digital signals, and a digital signal delay means, responsive to said digital signals, for providing said delayed digital signals after a predetermined interval of time;
- a second means responsive to said delayed digital signals for providing said analog electrical signals for recording on a recording medium by said recording means; and
- digital detection and control means for controlling said recording means comprising
  - a digital magnitude comparison means for providing a discrete output in response to each of said digital signals having a magnitude greater than a predetermined magnitude,
  - a first counting means, responsive to a predetermined number of said discrete outputs, for providing a control output,
  - a second counting means, responsive to the absence of said discrete outputs for a predetermined interval of time, for terminating said control output, and
  - a control means, responsive to said control output of said first counting means, for causing said recording means to be in said recording mode of operation.

2. A recording system as recited in claim 1 wherein said digital magnitude comparison means comprises at least one digital magnitude comparator.

3. A recording system as recited in claim 1 wherein said first counting means comprises an up/down counter.

4. The recording system of claim 1 wherein said predetermined number of said discrete outputs is selectively variable.

5. The recording system of claim 1 wherein said predetermined interval of time is selectively variable.

6. The recording system of claim 1 further including:
reset means for setting said first counting means to a zero count in response to the concurrent absence of a discrete output from said digital magnitude comparison means and said control output.

7. A recording system having a recording means for recording input electrical signals on a recording medium as transduced electrical signals when said recording means is in a recording mode of operation, and a means for introducing said input electrical signals into said system and for processing said input electrical signals to provide said transduced electrical signals for recording on said recording medium by said recording means, wherein the improvement comprises:
- a first means responsive to said input electrical signals for providing digital signals; and
- a digital detection and control means for controlling said recording means comprising
  - a digital magnitude comparison means responsive to said digital signals, for detecting digital signals of a magnitude corresponding to the magnitude of electrical input signals desired to be recorded and for providing a discrete output in response to each of said digital signals having a magnitude corresponding to the magnitude of electrical input signals desired to be recorded,
  - a first counting means, responsive to a predetermined number of said discrete outputs, for providing a control output,
  - a second counting means, responsive to the absence of said discrete outputs for a predetermined interval of time, for terminating said control output, and
  - a control means, responsive to said control output of said first counting means, for causing said recording means to be in said recording mode of operation.

8. A recording system as recited in claim 7 wherein said digital magnitude comparison means comprises at least one digital magnitude comparator.

9. A recording system as recited in claim 7 wherein said second counting means comprises an up/down counter.

10. The recording system of claim 7 wherein said predetermined number of said discrete outputs is selectively variable.

11. The recording system of claim 7 wherein said predetermined interval of time is selectively variable.

12. The recording system of claim 7 further including:
reset means for setting said first counting means to a zero count in response to the concurrent absence of a discrete output from said digital magnitude comparison means and said control output.

13. A recording system as recited in claim 7 wherein said first counting means comprises an up/down counter.

14. A recording system as recited in claim 13 wherein said second counting means comprises the up/down counter of said first counting means.

* * * * *